United States Patent [19]

Obermeier

[11] Patent Number: 5,594,832
[45] Date of Patent: Jan. 14, 1997

[54] BLACK BODY RADIATOR WITH REFLECTOR

[75] Inventor: Peter Obermeier, Fürstenfeldbruck, Germany

[73] Assignee: Deutsche Forschungsanstalt für Luft- und Raumfahrt e.V., Köln, Germany

[21] Appl. No.: 396,535

[22] Filed: Feb. 28, 1995

Related U.S. Application Data

[63] Continuation of Ser. No. 163,868, Dec. 9, 1993, abandoned.

[30] Foreign Application Priority Data

Dec. 10, 1992 [DE] Germany .......................... 42 41 617.5

[51] Int. Cl.$^6$ ...................................... G01J 5/52
[52] U.S. Cl. ................ 392/435; 392/422; 250/504 R
[58] Field of Search .................... 392/432–439, 392/422, 423, 407; 219/553; 250/493.1, 503.1, 504 R

[56] References Cited

U.S. PATENT DOCUMENTS

| | | | |
|---|---|---|---|
| 1,196,073 | 8/1916 | Berry et al. | 392/435 |
| 3,069,525 | 12/1962 | Waters | 392/435 |
| 3,126,468 | 3/1964 | Aitken et al. | 392/435 |
| 4,184,066 | 1/1980 | Svoboda . | |
| 4,346,651 | 8/1982 | Schickedanz | 219/482 |
| 4,387,301 | 6/1983 | Wirick et al. | 250/252.1 |
| 4,724,356 | 2/1988 | Dachler | 219/553 |

FOREIGN PATENT DOCUMENTS

| | | | |
|---|---|---|---|
| 665363 | 6/1963 | Canada | 392/439 |
| 0063415 | 10/1982 | European Pat. Off. . | |
| 547624 | 12/1922 | France | 165/53 |
| 3346456 | 7/1985 | Germany . | |
| 53-146344 | 12/1978 | Japan | 219/553 |
| 59-32720 | 2/1984 | Japan | 392/435 |
| 505220 | 5/1939 | United Kingdom | 392/436 |

OTHER PUBLICATIONS

Abstract of Japanese Patent No. 63–138220. *Patent Abstracts of Japan.* vol. 12, No. 396. Oct. 21, 1988.

*Primary Examiner*—John A. Jeffery
*Attorney, Agent, or Firm*—Browdy and Neimark

[57] ABSTRACT

A black body radiator for calibrating infrared measuring devices in the form of a heatable body is heated by means of a heating foil in the form of a metallic electrically excellently conducting heating coil embedded in a plastic sheet. The heating foil is adhered in excellently thermally conductive manner to a rear surface of the heatable body of the black body radiator. At a slight distance from and slightly inclined to the heating foil surface an infrared-radiation-reflecting mirror is arranged. The mirror reflects the radiation coming from the heating coil and incident thereon into the intermediate spaces of the heating coil so that the radiation passes through the heating foil and is absorbed by the rear side of the black radiator. The intermediate space between the heatable body and the mirror is evacuated. Furthermore, the rear side of the mirror and a holder are provided with a thermal insulation, for example in the form of ceramic paper.

7 Claims, 2 Drawing Sheets

BLACK BODY RADIATOR WITH REFLECTOR

This application is a continuation-in-part of application Ser. No. 08/163,868, filed Dec. 9, 1993, now abandoned.

BACKGROUND OF THE INVENTION

1. Field of the Invention

The invention relates to a black body radiator comprising a body which is heatable by means of a heating device and has temperature sensors, and a radiating surface.

2. Description of the Prior Art

For calibrating infrared measuring devices or meters black body radiators are employed which are introduced into the beam path of the measuring device. Usually, black body radiators are metallic bodies which are heated in various manners. All black body radiators emit the radiation in a limited space angle, at the most into half space. This means that the greater part of the heated body of the black body radiator is not employed for the actual purpose. To minimize the necessary heating power, the unemployed portions are insulated by conventional technique, for example by means of mineral wool, to avoid heat loss. A disadvantage here is that for good thermal insulation the radiator necessarily becomes large and on the other hand when a small structure is employed the heat losses become greater, in particular, it is difficult to integrate a calibrating radiator into a measuring device because a small structure leads to high heat losses which can disturb the actual measuring process particularly in the case of infrared measuring devices. On the other hand, good thermal insulation again results in a large and thus unwieldy device.

Usually, the electrical heating is effected via heating wires which are laid in the radiating body with good thermal contact. This results in a spatially initially inhomogeneous heating which should be made uniform by the heat flow in the body before the heat reaches the radiating surface so that at the latter a homogeneous heat distribution ensures a homogeneous radiation. This is achieved firstly by a large packing density of the heating wires and secondly by a large material thickness between the heating wires and the radiating surface; however, because of the expenditure and larger dimensions involved and the resulting additional weight both of these measures must be considered disadvantageous.

U.S. Pat. No. 4,387,301 discloses a surface radiator with structured surface with which radiation patterns for thermal cameras are generated. Furthermore, from DE 33 46 456 C2 a black body radiator is known which comprises a galvanically coated surface serving as thermoelement for measuring a temperature. From U.S. Pat. No. 4,184,066 a surface radiator is moreover known in which special ceramic heating elements are employed. In addition, the heating element is surrounded by a housing which has a hood-like cover by which the surface radiator is shielded from external light which would otherwise impinge on the surface radiator.

SUMMARY OF THE INVENTION

The invention is therefore based on the problem of providing a black body radiator of compact construction and of small power requirement for calibrating infrared measuring devices.

The invention therefore proposes a black body radiator comprising a body which is heatable by means of a heating device and has temperature sensors, and a radiating surface, wherein for heating the black body radiator a metallic heating foil of good conductivity, embedded in a plastic sheet, is applied on the form of a heating coil or a heating meander in good thermally conductive manner onto a rear surface of the heatable body of the black body radiator, at a slight distance from the rear surface on which the heating foil is applied and either parallel to or slightly inclined to said surface an infrared-radiation-reflecting mirror of poorly thermally conductive material of the same size as the surface is applied, onto which the heating foil is applied, and evacuation is effected of the intermediate space between the heatable body and the mirror, which are connected by means of a frame-like holder of poorly thermally conductive material.

Advantageous embodiments of the invention are defined by the features of the subsidiary claims.

Because of the compact construction achieved with the black body radiator according to the invention, said radiator can be incorporated in particularly advantageous and simple manner into infrared measuring devices.

BRIEF DESCRIPTION OF THE DRAWINGS

Hereinafter the invention will be explained in detail with the aid of an example of embodiment with reference to the attached drawings, wherein.

DESCRIPTION OF THE PREFERRED EMBODIMENT

Figure 1A:
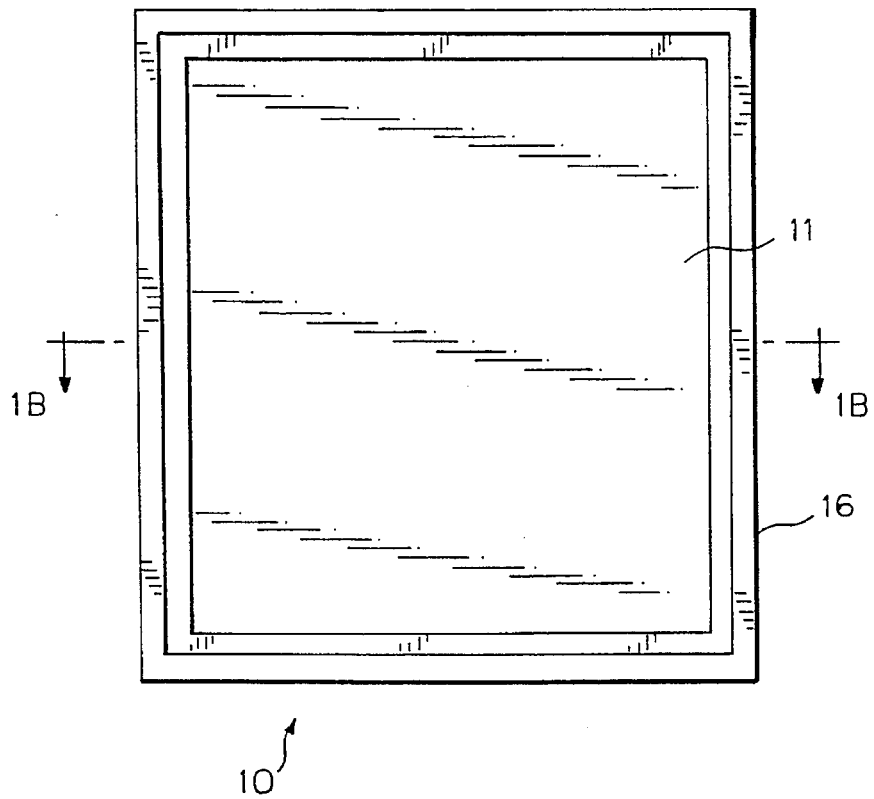
FIG. 1A shows in plan view.

In a preferred embodiment of a black body radiator 10, to heat the latter a heating foil 14 in the form of a metallic electrically excellently conductive heating coil 14a or a corresponding heating meander 14a (see FIG. 1B), embedded in a plastic sheet, is applied, preferably adhered, to a rear surface 13 of the heatable body 11 of the black body radiator 10. In FIG. 1A, to simplify the illustration the heating coil or heating meander is not shown whilst in the sectional view of FIG. 1B the heating coil or heating meander 14a is shown by more thickly drawn short dashes.

Figure 1B:
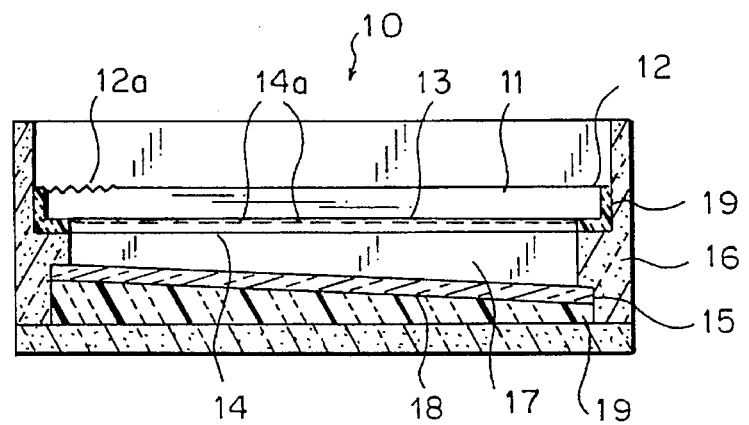
FIG. 1B shows in sectional view along the line B—B a schematic illustration of a black body radiator according to the invention.

In the sectional view of FIG. 1B part of the radiating surface 12 of the black body radiator 10 is indicated at a point 12a with furrows, thereby increasing the effective area of the black body radiator 10 by forming in the heatable body 11 small parallel grooves or small pyramids resulting from perpendicularly intersecting parallel grooves. FIG. 1B shows mirror 15 slightly inclined. In an alternative embodiment the mirror 15 is parallel to surface 13, and this alternative embodiment is otherwise the same as FIG. 1B with no other differences.

Figure 2:
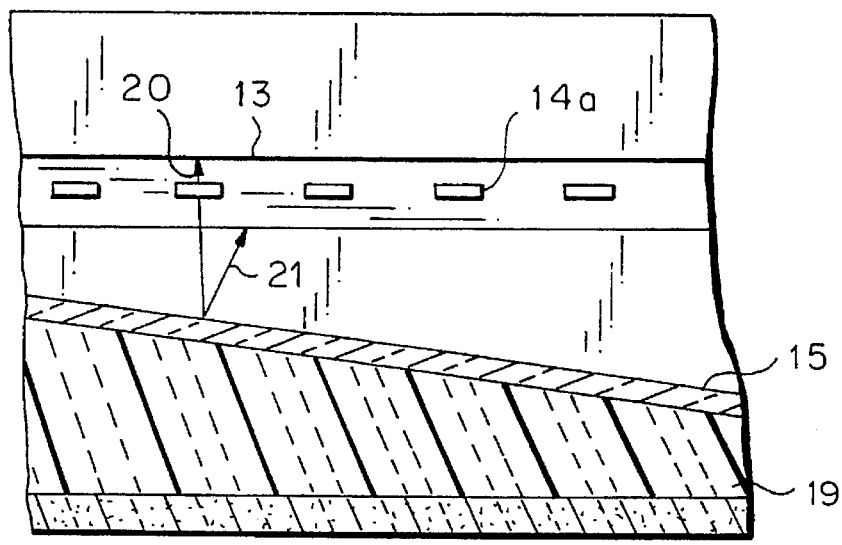
FIG. 2 shows the course of infrared beams through the black body radiator of FIG. 1B.
Figure 3:
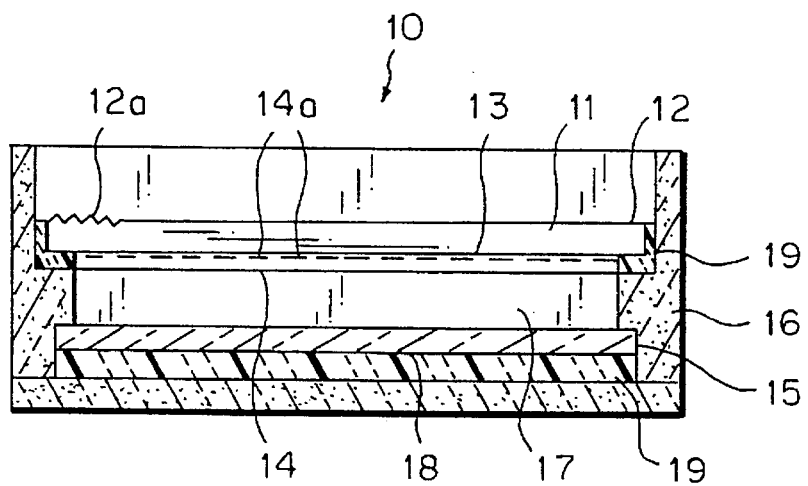
FIG. 3 is an alternative embodiment of the invention according to FIG. 2.

An infrared-radiation-reflecting mirror 15 of poorly thermally conductive material is arranged at a slight distance of the order of magnitude of a few millimeters to a few centimeters from the surface 13 adhered to the heating foil 14, either parallel to or slightly inclined in a plane to said surface, and has the same size as the area 13 covered with the heating foil 14. With respect to the plane of the heating foil 14 a highly polished mirror 15 is slightly inclined in a plane, within a range of 0.5° to 5° (or more so), preferably about 1° that by said mirror the radiation coming from the heating coil or heating meander and impinging on the mirror is reflected into intermediate spaces of the heating coil or heating meander, passes through the heating foil 14 and is absorbed by the rear surface of the heated and thus radiating body 11 of the black body radiator 10. FIG. 2 shows the passage of infra-red beams 20 and 21 into the heating foil.

However, when using a conventional or unpolished mirror, the mirror 15 need not be inclined to the plane of the heating foil at all and can be parallel to such plane since the roughness that is unavoidable in such conventional or unpolished mirror suffices to reflect energy in the required way. The heatable body 11 and the mirror 15 are connected closely together by means of a frame-like holder 16 of poorly thermally conductive material and the intermediate space 17 between the two parts arranged spaced from each other, i.e. the heatable body 11 and the mirror 15, is evacuated. Furthermore, the rear side of the mirror 15 and the holder 16 are provided with a thermal insulation 19 for example in the form of ceramic paper.

Due to the structure according to the invention the black body radiator 10 can be made in a very flat form because due to the thermally insulating effect of the evacuated intermediate space only a flat additional thermal insulation 19 is necessary. Furthermore, the rearwardly irradiated radiation power is returned again by the mirror 15. Since the radiation flux is deflected through the heat reflection by the mirror 15 between the individual sections of the heating coil or heating meander of the heating foil 14, the effectiveness of the measure is still further increased and contributes to the homogenization of the temperature distribution; this in turn makes it possible to reduce the thickness of the black body radiator 10. Due to the compact flat construction of the black body radiator 10, the latter can readily be integrated into measuring devices. This makes the radiator particularly suitable for incorporation into line scanners in which two radiator units can be mounted at the opposite edges of the scan area.

I claim:

1. A black body radiator comprising a body which is heatable by means of a heating device and further comprising temperature sensors, and said body having radiating front and rear surfaces, wherein the black body radiator further comprises, a metallic heating foil of high thermal conductivity embedded in a plastic sheet, said metallic heating foil applied onto a rear surface of said body in a meandering fashion such that good thermal conductivity is achieved between said metallic heating foil and said body, an infrared radiation reflecting mirror, comprised of low thermal conductivity material, said mirror being of the same size as said body, whereby said mirror is spaced away from the rear surface of the body, a frame-like holder comprised of low thermal conductivity material, said frame-like holder connected to said body and said mirror such that an intermediate space is formed between said body and said mirror, the intermediate space between said body and said mirror being evacuated, wherein the mirror is positioned such that radiation passing through the heating foil and impinging on the mirror is reflected into said intermediate space and then passes through said heating foil and is absorbed by said rear surface.

2. A black body radiator according to claim 1, wherein the foil embedded in a plastic sheet is adhered to the rear surface of the heatable body.

3. A black body radiator according to claim 1, wherein rear side of the mirror and the holder are provided with ceramic paper for thermal insulation.

4. A black body radiator according to claim 1, wherein a highly polished mirror is inclined in a plane with respect to the plane of the heating foil in such a manner that it reflects the radiation coming from the metallic heating foil and incident on said mirror into intermediate spaces of the metallic heating foil so that the radiation passes through the heating foil and is then absorbed by the rear surface of the heated and thus radiating body.

5. A device according to claim 1, wherein the material of the plastic sheet which allows the infrared radiation to pass almost unattenuated and into which heating coil or heating meander are embedded is polyvinyl chloride (PVC) or polyester.

6. A device according to claim 1, wherein the infrared-radiation-reflecting mirror is a ground glass plate vapor plated with gold or aluminum on the surface facing the heating foil.

7. A black body radiator according to claim 1, wherein an unpolished mirror is parallel in a plane with respect to the plane of the heating foil in such a manner that it reflects the radiation coming from the metallic heating foil and incident on said mirror into intermediate spaces of the metallic heating foil so that the radiation passes through the heating foil and is then absorbed by the rear surface of the heated and thus radiating body.

* * * * *